United States Patent [19]
Williamson et al.

[11] Patent Number: 5,731,548
[45] Date of Patent: Mar. 24, 1998

[54] BIG DIAL SCALE MECHANISM

[75] Inventors: Sidney Williamson; Stan B. Hanssen, both of Las Cruces, N. Mex.

[73] Assignee: Metro Corporation, Las Cruces, N. Mex.

[21] Appl. No.: 603,168

[22] Filed: Feb. 20, 1996

[51] Int. Cl.[6] .................................................. G01G 21/08
[52] U.S. Cl. .................. 177/256; 177/186; 177/225; 177/174
[58] Field of Search ................................ 177/225, 226, 177/227, 228, 230, 186, 187, 188, 173, 174, 256

[56] References Cited

U.S. PATENT DOCUMENTS

| | | | |
|---|---|---|---|
| 1,622,106 | 3/1927 | Hallwood | 177/186 |
| 2,073,912 | 3/1937 | Walker | 177/173 |
| 3,405,775 | 10/1968 | Grady et al. | 177/225 |
| 4,014,396 | 3/1977 | Lohmann et al. | 177/173 |
| 4,084,650 | 4/1978 | Terraillon | 177/174 |

*Primary Examiner*—Michael L. Gellner
*Assistant Examiner*—Randy W. Gibson
*Attorney, Agent, or Firm*—Wood, Phillips, VanSanten, Clark & Mortimer

[57] ABSTRACT

A big dial platform scale includes a scale base. A weight sensing apparatus is supported on the base including a weight supporting platform movable relative to the base and a weight sensing mechanism responsive to movement of the platform for moving a beam. A weight indicating apparatus is supported on the base for rotation relative thereto for indicating weight on the platform. A pinion is operatively connected to the weight indicating apparatus for rotating the weight indicating apparatus. A rack is movably supported on the base and operatively engages the pinion for rotating the same. A spring rope is connected between the beam and the rack for transferring movement of the beam to the rack to drive the weight indicating apparatus.

18 Claims, 5 Drawing Sheets

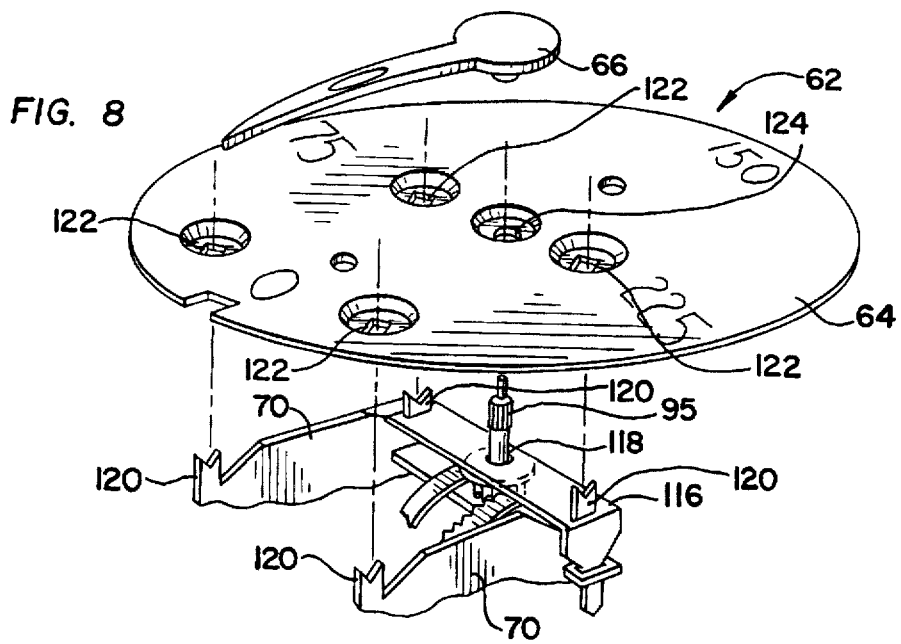
FIG. 8
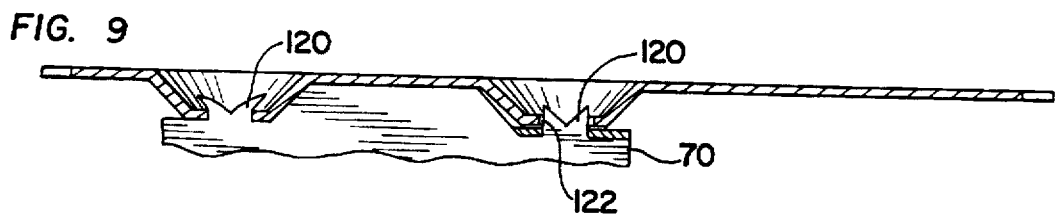
FIG. 9
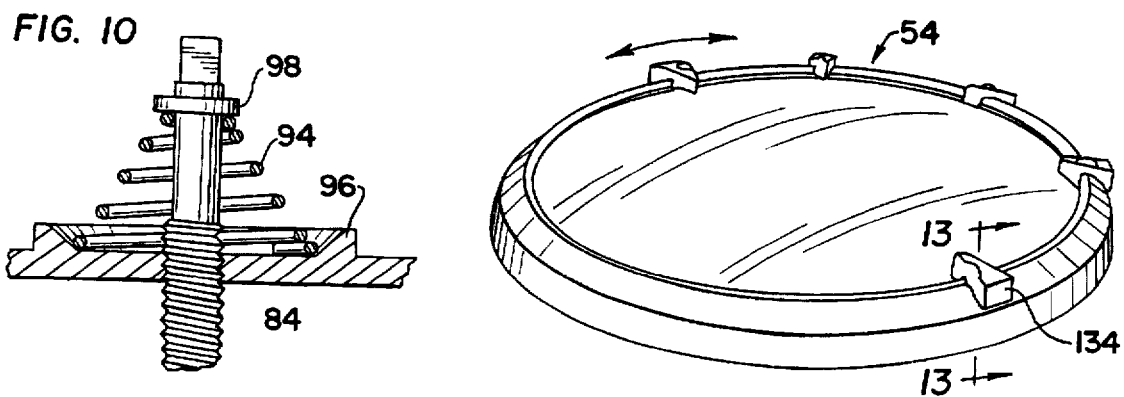
FIG. 10
FIG. 12
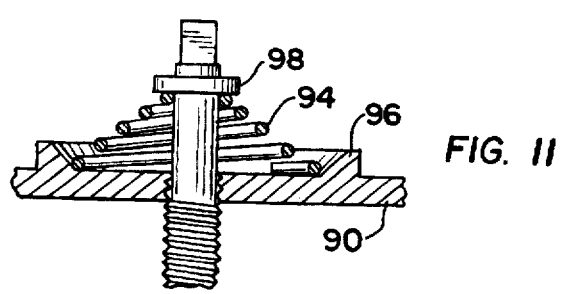
FIG. 11

BIG DIAL SCALE MECHANISM

FIELD OF THE INVENTION

This invention relates to platform scales and, more particularly, to a scale mechanism for a big dial scale.

BACKGROUND OF THE INVENTION

Various types of platform scales have been designed and manufactured by scale manufacturers. These scales include a conventional mechanical analog scale including a base and a platform movable relative to the base. A lever structure is movable responsive to movement of the platform. In one form, the lever structure causes rotation of a dial. In another form, the lever structure causes rotation of a pointer relative to a fixed dial. Particularly, in a scale referred to as a "big dial scale", a large dial is affixed to the base and includes large indicia representing weight amounts. The pointer is movable relative to the dial to indicate weight. Typically, there is a direct mechanical linkage between the lever and the pointer. In one form this comprises a rack directly driven by the lever for operating a pinion affixed to the pointer. Owing to such a direct drive construction, the full load on the platform is applied to the rotational element, i.e., the pointer or the dial.

The present invention is directed to overcoming one or more of the problems discussed above in a novel and simple manner.

SUMMARY OF THE INVENTION

In accordance with the invention, there is disclosed a platform scale using a spring to connect a weight sensing apparatus to a weight indicating apparatus.

Broadly, there is disclosed herein a platform scale including a scale base. A weight sensing apparatus is supported on the base including a weight supporting platform movable relative to the base and a weight sensing mechanism responsive to movement of the platform for moving a beam. A weight indicating apparatus is supported on the base for rotation relative thereto for indicating weight on the platform. A pinion is operatively connected to the weight indicating apparatus for rotating the weight indicating apparatus. A rack is movably supported on the base and operatively engages the pinion for rotating the same. A spring rope is connected between the beam and the rack for transferring movement of the beam to the rack to drive the weight indicating apparatus.

In accordance with one aspect of the invention the rack comprises a circular rack pivotally mounted on the base.

In accordance with another aspect of the invention a rack spring is connected between the rack and the base for biasing the rack away from the beam. The rack spring pulls the rack toward the pinion to remove backlash from between the rack and pinion.

In accordance with a further aspect of the invention, the weight indicating apparatus comprises a dial affixed to the base and a pointer mounted to the pinion.

In accordance with a still further aspect of the invention, the weight sensing mechanism comprises a main spring connected between the base and the beam. A zero adjustment mechanism adjusts position of the main spring relative to the base. The zero adjustment mechanism includes an adjusting wheel mounted to a frame on the base. The wheel is threadably connected to a spring calibrator which is operatively connected to the spring, whereby rotation of the wheel raises and lowers the spring and thus the beam. A safety spring is mounted between the spring calibrator and the wheel for maintaining the threaded connection between the adjusting wheel and the spring calibrator.

In accordance with yet another aspect of the invention, the spring rope is adapted to provide proportional movement between the beam and the rack, and to act as a shock absorber if a shock load is applied to the platform.

It is disclosed in accordance with an additional aspect of the invention a big dial scale comprising a scale base. A weight sensing apparatus is supported on the base including a weight supporting platform movable relative to the base and a weight sensing mechanism responsive to movement of the platform for moving a beam. A frame is mounted to the scale base beneath the platform. A weight indicating apparatus is supported on the frame including a dial affixed to the frame including indicia representing weight on the platform and a pointer for rotation relative to the dial for indicating weight on the platform. A pinion is operatively connected to the pointer for rotating the pointer. A circular rack is pivotally supported by the frame and operatively engages the pinion for rotating the same. A spring rope is connected between the beam and the rack for transferring movement of the beam to the rack to drive the pinion and thus the pointer.

Further features and advantages of the invention will be readily apparent from the specification and from the drawing.

BRIEF DESCRIPTION OF THE DRAWING

FIG. 8 is an exploded, perspective view, of a weight indicating apparatus of the scale of FIG. 1;

FIG. 9 is a sectional view illustrating how the dial is secured to a frame;

FIG. 10 is a partial sectional elevation view of a zero adjust mechanism of the scale of FIG. 1;

FIG. 11 is a view similar to that of FIG. 10 illustrating use of a safety spring for the zero adjust mechanism;

FIG. 12 is a perspective view of a lens cover for the scale of FIG. 1;

DETAILED DESCRIPTION OF THE INVENTION

Figure 1:
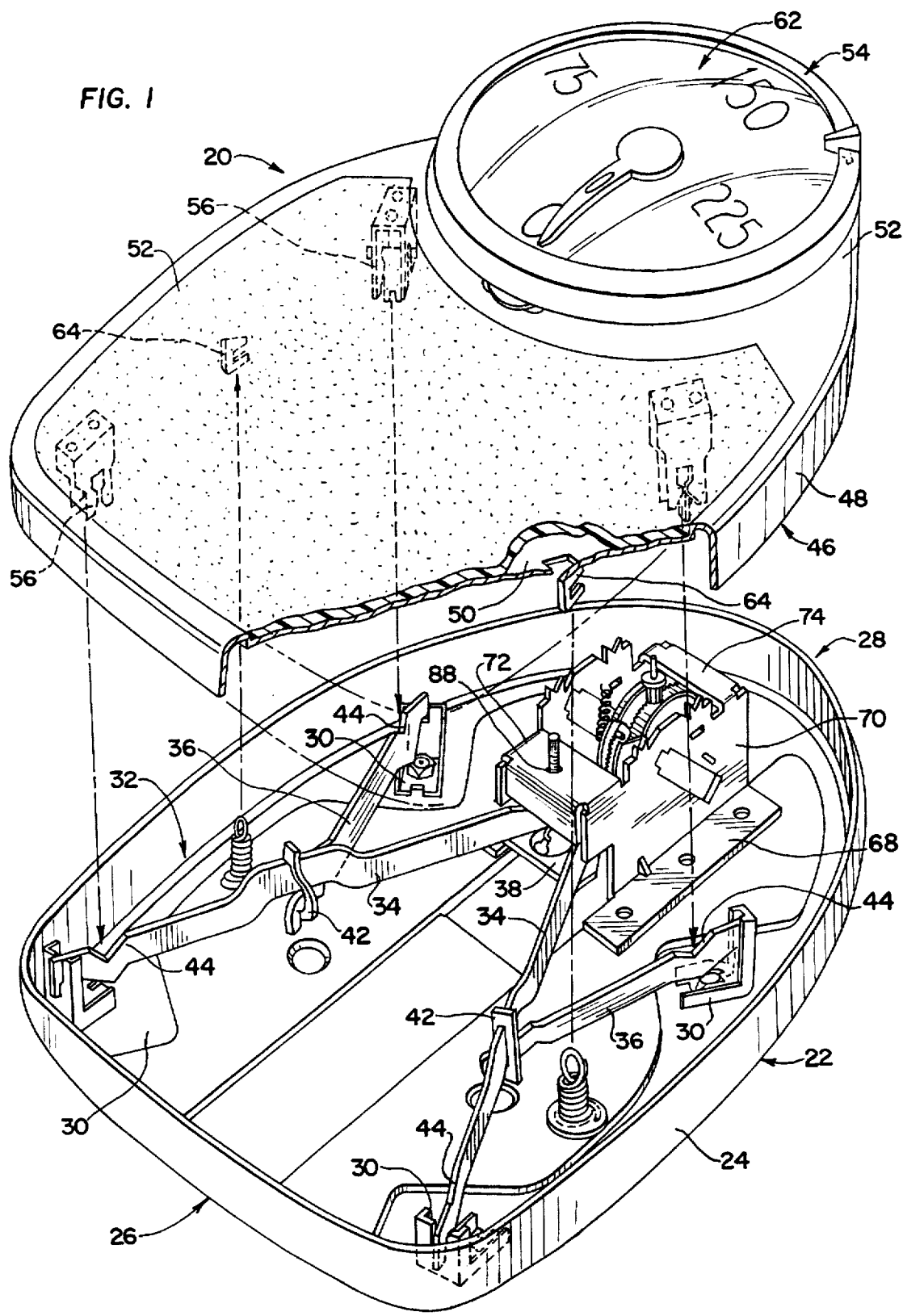
FIG. 1 is an exploded perspective view, with parts cut away for clarity, of a big dial platform scale according to the invention.
Figure 2:
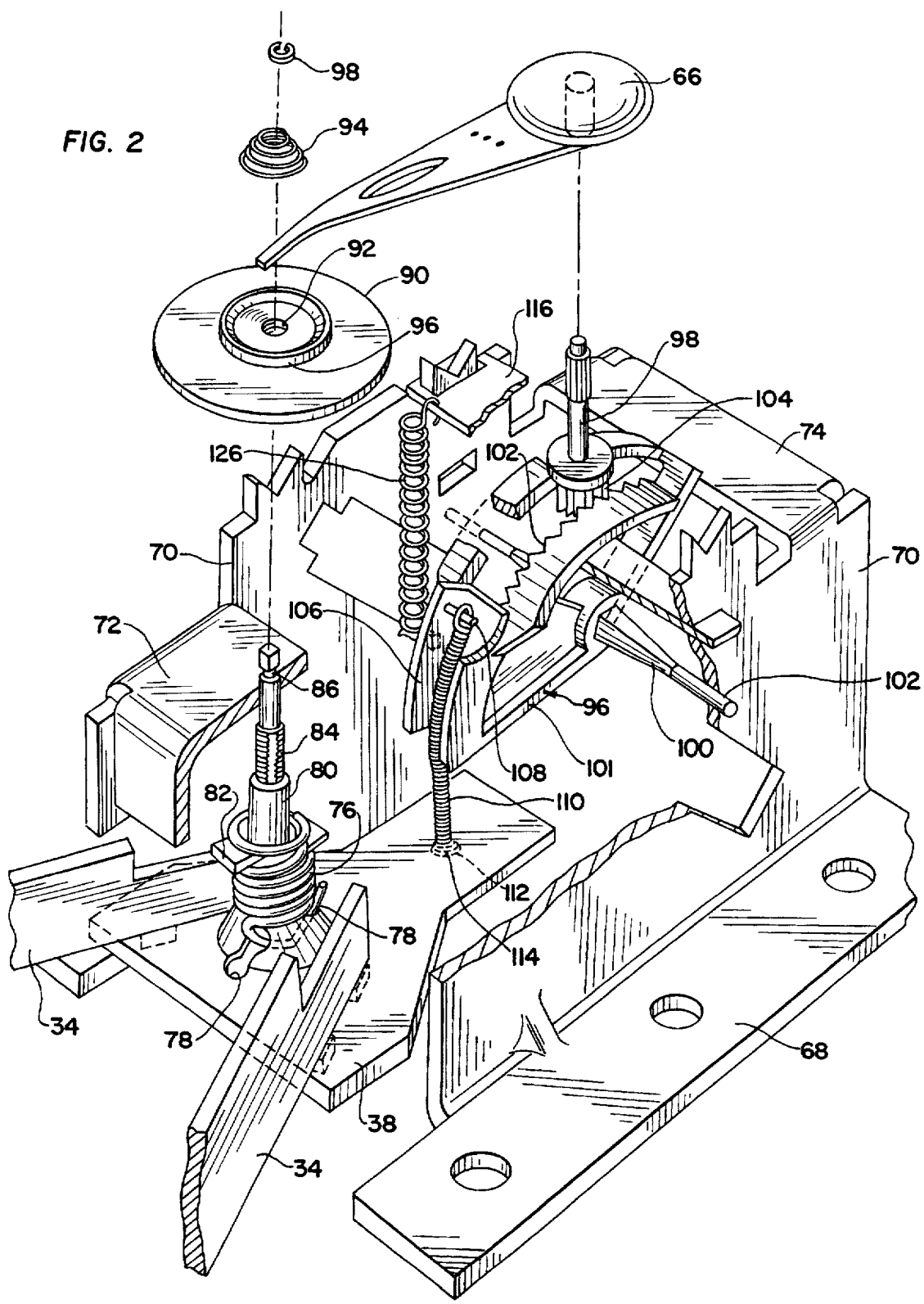
FIG. 2 is a detailed perspective view of a scale mechanism of the scale of FIG. 1.

Referring to the drawings and, more particularly, to FIGS. 1 and 2, there is shown a big dial platform type bathroom scale 20 according to the invention. The scale 20 is provided with a base 22 formed as a stamped sheet metal member having an integral upstanding peripheral rim 24. The shape of the base 22 may be chosen to make any particular scale design and is generally "bullet" shaped in the illustrated embodiment of the invention, with a generally rectangular front weight end 26 and an opposite rear rounded end 28. The sheet metal base 22 is adapted to rest directly upon a floor or floor covering and support the mechanism of the scale therein. The mechanism support is formed by four slotted brackets 30 suitably secured to the base 20 at opposite corners of the rectangular weight end 26, as illustrated.

Figure 3:
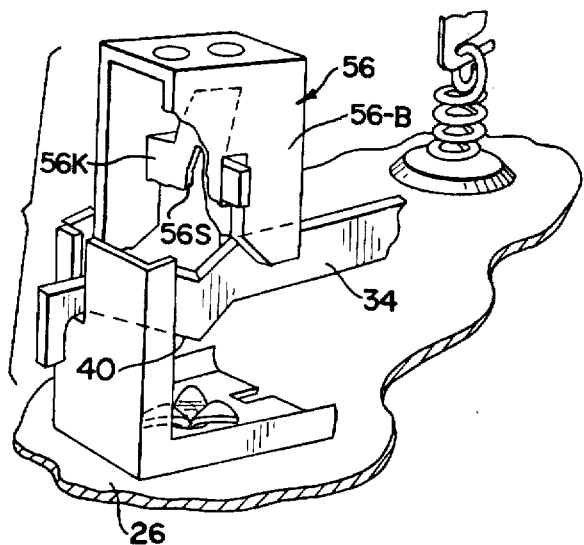
FIG. 3 is a detailed perspective view of a portion of a weight sensing mechanism for transferring weight from a weight supporting platform to a lever mechanism.
Figure 4:
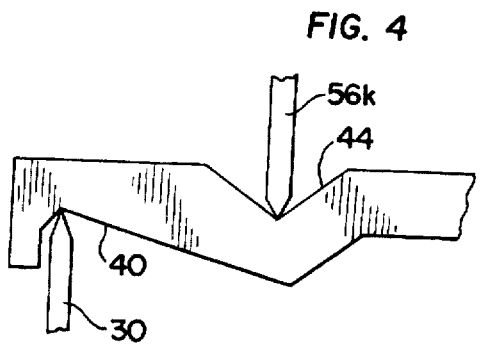
FIG. 4, is a side view of a portion of the weight sensing apparatus of FIG. 3.

A weight sensing apparatus 32 consists of a pair of primary levers 34 and a pair of secondary levers 36 arranged in interconnected fashion and resting upon the slotted brackets 30. The pair of primary levers 34 are joined to a noseiron or beam 38 extending toward the base rounded end 28 and diverge therefrom toward opposite adjacent corners of the weight end 26 and supported on the brackets 30. The primary levers 34 are each arranged on edge relative to the base 22 and have an inverted "V" notch 40 across the thickness of the lever to rest upon the brackets 30, as particularly illustrated in FIGS. 3 and 4 at the base weight end 26.

The secondary levers 36 have inverted "V" notch portions (not shown) which similarly rest upon the brackets 30 toward the base rounded end 28. The other end of each of the secondary levers 36 is connected to and hangs below a primary lever 34 intermediate its ends by means of a bracket 42. Each of the primary levers 34 and secondary levers 36 has a V-portion 44 located adjacent to the corner portion which supports the levers.

A weight supporting platform 46 is formed as a stamped sheet metal member having an integral downwardly depending peripheral rim 48. The platform 46 is of a shape corresponding to the shape of the base 22 but of a slightly larger size to be received thereon, so that the platform rim 48 receives the base rim 24. As a result, the platform rim 48 hides most of the base rim 24 from view.

The platform 46 includes a weight receiving surface 50. A mat 52, which may be of, for example, rubber, is adhered to the surface 50 to provide proper footing. The platform, although not shown, includes a circular opening proximate a rounded end 52 for removably receiving a lens 54.

Depending downwardly from the underside of the platform 48 are four hangers 56, three of which are shown. The hangers 56 are positioned to coincide with position of the lever V-portions 44. As a result, any load on the platform support surface 50 is transferred via the hangers 56 to the weight sensing apparatus 32 in a conventional manner. Each of the hangers 56 comprises a U-shaped bracket 56-B having opposite openings loosely receiving a knife 56-K having a slot 56-S receiving the lever V-portion 44.

Figure 5:
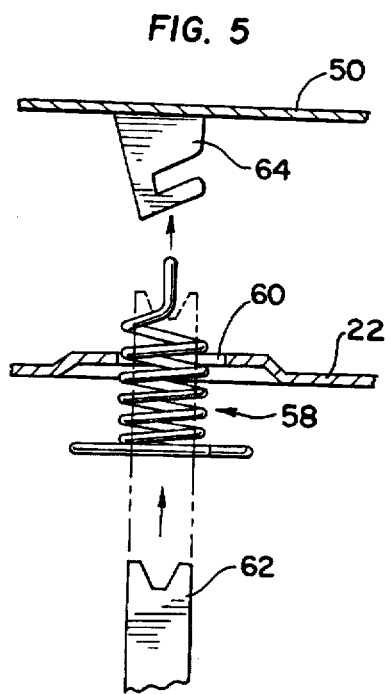
FIG. 5 is an exploded view illustrating a procedure for connecting a weight supporting platform to a base of the scale of FIG. 1.
Figure 6:
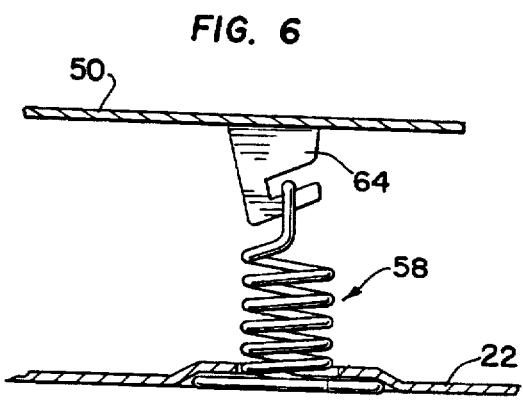
FIG. 6 is a view similar to that of FIG. 5 showing connection of the platform to the base.
Figure 7:
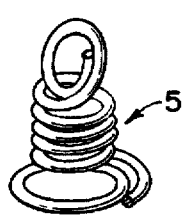
FIG. 7 is a perspective view of the spring used for connecting the platform to the base.

Referring also to FIGS. 5–7, a plurality of hook-up springs 58 are used for fastening the platform 46 to the base 22. Particularly, each spring 58 includes an enlarged lower end. The spring is inserted upwardly through an associated opening 60 in the base 22 using a notched rod auto hooker 62, as shown in FIG. 5, with an upper end of the spring 58 being secured to a hook 64 depending downwardly from the platform support surface 50.

A weight indicating apparatus 62 is visible through the lens 54. Referring also to FIG. 8, the weight indicating apparatus 62 comprises a dial 64 and pointer 66. The dial 64 includes indicia in the form of numbers printed thereon representative of weight to be supported on the platform 46. The pointer, as described below, is affixed for rotation relative to the dial 64 for indicating weight on the platform 46.

The present invention is particularly directed to the mechanism for operatively interconnecting the weight sensing apparatus 32 to the weight indicating apparatus 62.

Referring again to FIGS. 1 and 2, a frame 68 is secured by any known means to the base 22 at the rounded end 28. The frame 68 includes opposite vertical walls 70 connected by front and rear cross members 72 and 74, respectively. As illustrated, the noseiron or beam 38 extends into the frame 68 between the vertical wall 70 and below the front cross member 72.

A main spring 76 is connected between the frame 68 and the beam 38. Particularly, the main spring 76 includes a lower end extending through openings 78 in the beam to directly fasten the spring 76 to the beam 38. A spring calibrator 80 is telescopically received in the spring 76 and extends upwardly therefrom. The spring calibrator 80 includes two radially extending arms 82 received between spiral portions of the spring 76 to connect the calibrator 80 to the main spring 76. The calibrator 80 includes a threaded portion 84 upwardly of the arms 82. An annular notch 86 is provided near the top of the calibrator 80 above the threaded portion 84. The calibrator threaded portion 84 extends upwardly through an opening 88 in the frame front cross member 72, see FIG. 1. An adjusting wheel 90 having a threaded central opening 92 is threaded onto the calibrator threaded portion 84 above the frame cross member 72. A tapered safety spring 94 is positioned atop the wheel 90 within a circular ridge 96. A snap ring 98 secures the spring 94 between the adjusting wheel 90 and the upper end of the calibrator 80.

As described, the adjusting wheel 90 and calibrator 80 operate as a zero adjustment mechanism for the scale. Particularly, by turning the adjusting wheel 90, the calibrator is resultingly raised or lowered to vary the vertical position of the beam 38, via the main spring 76, relative to the frame 68 and thus base 22. The safety spring 94 keeps the adjusting wheel 90 from unscrewing off of the calibrator threaded portion 84 if someone keeps spinning the adjusting wheel. Instead, the threads will ratchet until the wheel is turned the other way. The threads will then restart. This is illustrated in FIG. 11.

Weight applied to the scale 20 is transferred through the levers 34 and 36 to a central point on the noseiron or beam 38. Any vertical movement of the beam 38 stretches the calibrated main spring 76. Any vertical movement of the beam 38 is transferred proportionally to a rack 96 and pinion 98 for driving the pointer 66.

Particularly, the rack 96 comprises a circular rack. The rack 96 is pivotally movable relative to the frame 68 through spokes 101 connected to an axle 100 received in openings 102 in each of the frame vertical walls 70. The rack 96 is geared at an arcuate peripheral portion 102 connected to the spokes for engaging a pinion gear 104 of the pinion 98. An upper end of the pinion 98 extends upwardly into the pointer 66 so that the pointer 66 is rotational with the pinion 98. The rack includes an arcuate channel 106 extending from the geared portion 102 and including a pin 108 at an upper end. A spring rope 110 is connected between the beam 38 and the rack 96 for transferring movement of the beam 38 to the rack 96. Particularly, the spring rope 110 includes an enlarged lower end 112 received in an opening 114 in the beam 38. An upper end of the spring rope 110 is hooked to the pin 108. The spring rope 110 is a tightly wound spring having high initial tension.

A cross bracket 116 extends across the frame 68 between the vertical wall 70 and includes a central opening 118, see FIG. 8, for receiving the pinion 98. The bracket 116 thus maintains a desired position of the pinion 98 engaging the rack 96. The bracket 116 is received on fingers 120 extending upwardly from the vertical walls 70. The fingers are also received in corresponding openings 122 in the dial 64 and are then bent over as shown in FIG. 9, to fasten the dial 64 to the frame 68. The dial 64 includes a central opening 124 for receiving the pinion 98.

Referring again to FIG. 2, a rack spring 126 is connected between the cross bracket 116 and the rack 96. The rack spring 126 biases the rack 96 away from the beam 38. The rack spring 126 also pulls the rack 96 slightly to the side toward the pinion 98 to remove any backlash from the rack and pinion.

Figure 13:
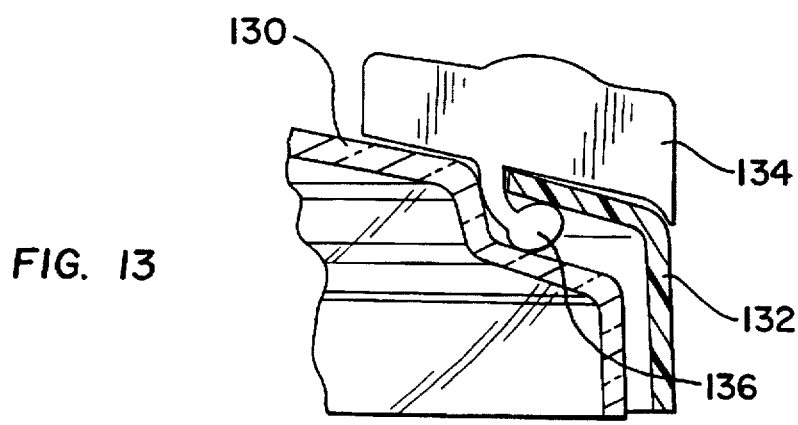
FIG. 13 is a sectional view taken along a line 13—13 of FIG. 12.

Referring to FIGS. 12 and 13, the lens 54 is illustrated. The lens 54 comprises a clear plastic dome 130 surrounded by a bezel 132. The bevel 132 is secured to the dome by any known means. A plurality of weight track indicators 134 include downwardly extending arms 136 received between the bezel 132 and dome 130. The angular position of the indicators 134 can be adjusted by a user to indicate, for example, a desired weight or a prior weight.

Figure 14:
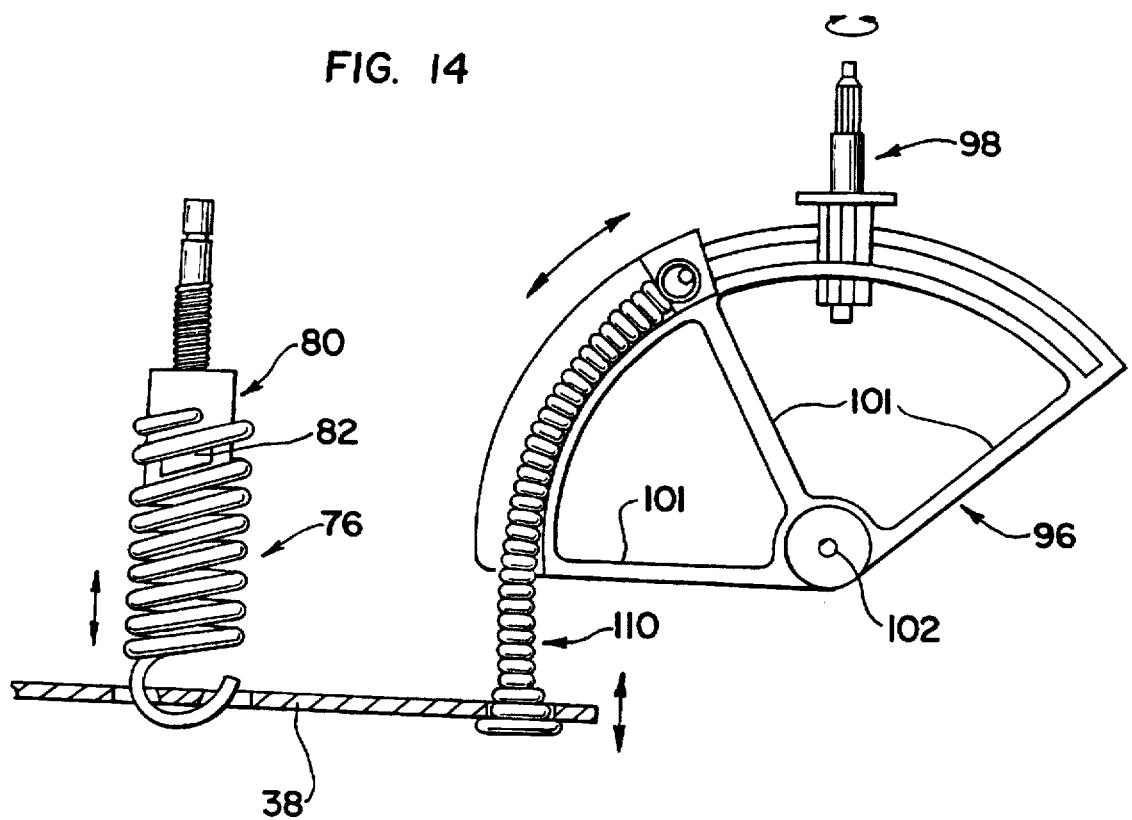
FIG. 14 is an elevation view generally illustrating operation of the scale mechanism according to the invention.

Thus, in accordance with the invention, as particularly illustrated in FIG. 14, any load in the form of weight applied to the scale platform 46 is transferred via the weight sensing apparatus 32 to the beam 38. Any vertical movement of the beam 38 is transferred proportionally to the outside diameter of the rack 96 by the spring rope 110. Because of the high tension of the spring rope 110, the spring rope 110 pulls the rack 96. The pinion 98 turns proportionally to the rotation of the rack 96 to rotate the pointer 66 relative to the dial 64 and thus indicate weight on the platform 46.

In accordance with the described mechanism, the load is supported by the main spring 76. When a load is applied to the scale 20, the spring rope 110 applies only enough pressure on the rack 96 to turn the pinion 98 and stretch the rack spring 126. The spring rope 110 transfers only the movement of the beam 38 to the rack 96 and not the load. By not transferring the load directly through the rack 96, friction is reduced significantly. The spring rope 110 also acts as a shock absorber when a shock load is applied to the scale.

Thus, in accordance with the invention, there is disclosed a platform scale for transferring movement of a weight sensing apparatus to a weight indicating apparatus through a spring rope.

I claim:

1. A platform scale comprising:
   a scale base;
   weight sensing apparatus supported on said base including a weight supporting platform movable relative to said base and a weight sensing mechanism responsive to movement of said platform for moving a beam;
   weight indicating apparatus supported on said base and for rotation relative thereto for indicating weight on said platform;
   a pinion operatively connected to said weight indicating apparatus for rotating the weight indicating apparatus;
   a rack movably supported on said base and operatively engaging said pinion for rotating the same; and
   a spring rope having a first end connected to said beam and a second end connected to said rack whereby movement of the beam causes the spring rope to pull the rack to transfer movement of the beam to the rack to drive the weight indicating apparatus.

2. The platform scale of claim 1 wherein said rack comprises a circular rack pivotally mounted on said base.

3. The platform scale of claim 1 further comprising a rack spring connected between said rack and the base for biasing the rack away from the beam.

4. The platform scale of claim 3 wherein said rack spring pulls the rack toward the pinion to remove backlash from between the rack and pinion.

5. The platform scale of claim 1 wherein said weight indicating apparatus comprises a dial affixed to the base and a pointer mounted to the pinion.

6. The platform scale of claim 1 wherein said weight sensing mechanism comprises a main spring connected between said base and the beam.

7. The platform scale of claim 6 further comprising a zero adjustment mechanism for adjusting position of the main spring relative to the base.

8. The platform scale of claim 7 wherein said zero adjustment mechanism includes an adjusting wheel mounted to a frame on the base, the wheel being threadably connected to a spring calibrator which is operatively connected to the spring, whereby rotation of the wheel raises and lowers the spring and thus the beam.

9. The platform scale of claim 8 further comprising a safety spring mounted between the spring calibrator and the wheel for maintaining the threaded connection between the adjusting wheel and the spring calibrator.

10. The platform scale of claim 1 wherein said spring rope is adapted to provide proportional movement between the beam and the rack, and to act as a shock absorber if a shock load is applied to the platform.

11. A big dial scale comprising:
   a scale base;
   weight sensing apparatus supported on said base including a weight supporting platform movable relative to said base and a weight sensing mechanism responsive to movement of said platform for moving a beam;
   a frame mounted to the scale base beneath the platform;
   weight indicating apparatus supported on said frame including a dial affixed to the frame including indicia representing weight on the platform and a pointer for rotation relative to the dial for indicating weight on said platform;
   a pinion operatively connected to said pointer for rotating the pointer;
   a circular rack pivotally supported by said frame and operatively engaging said pinion for rotating the same; and
   a spring rope connected between said beam and said rack for transferring movement of the beam to the rack to drive the pinion and thus the pointer.

12. The platform scale of claim 11 further comprising a rack spring connected between said rack and the frame for biasing the rack away from the beam.

13. The platform scale of claim 12 wherein said rack spring pulls the rack toward the pinion to remove backlash from between the rack and pinion.

14. The platform scale of claim 11 wherein said weight sensing mechanism comprises a main spring connected between said frame and the beam.

15. The platform scale of claim 14 further comprising a zero adjustment mechanism for adjusting position of the main spring relative to the frame.

16. The platform scale of claim 15 wherein said zero adjustment mechanism includes an adjusting wheel mounted to the frame, the wheel being threadably connected to a spring calibrator which is operatively connected to the spring, whereby rotation of the wheel raises and lowers the spring and thus the beam.

17. The platform scale of claim 16 further comprising a safety spring mounted between the spring calibrator and the wheel for maintaining the threaded connection between the adjusting wheel and the spring calibrator.

18. The platform scale of claim 11 wherein said spring rope is adapted to provide proportional movement between the beam and the rack, and to act as a shock absorber if a shock load is applied to the platform.

* * * * *